United States Patent
Hasegawa

(10) Patent No.: US 10,814,843 B2
(45) Date of Patent: Oct. 27, 2020

(54) BRAKE FLUID PRESSURE CONTROL DEVICE FOR VEHICLES WITH BAR HANDLE

(71) Applicant: NISSIN KOGYO CO., LTD., Tomi, Nagano (JP)

(72) Inventor: Tetsuya Hasegawa, Tomi (JP)

(73) Assignee: NISSIN KOGYO CO., LTD., Tomi, Nagano (JP)

( * ) Notice: Subject to any disclaimer, the term of this patent is extended or adjusted under 35 U.S.C. 154(b) by 164 days.

(21) Appl. No.: 15/919,675

(22) Filed: Mar. 13, 2018

(65) Prior Publication Data
US 2018/0265057 A1 Sep. 20, 2018

(30) Foreign Application Priority Data
Mar. 14, 2017 (JP) ................... 2017-049130

(51) Int. Cl.
B60T 8/17 (2006.01)
B60T 8/171 (2006.01)
B60T 8/172 (2006.01)
(Continued)

(52) U.S. Cl.
CPC ............ B60T 8/1706 (2013.01); B60T 8/171 (2013.01); B60T 8/172 (2013.01); B60T 8/261 (2013.01);
(Continued)

(58) Field of Classification Search
CPC .... B60T 2250/04; B60T 17/14; B60T 8/1812; B60W 30/18145; B60G 2400/204; B60G 2800/24
See application file for complete search history.

(56) References Cited

U.S. PATENT DOCUMENTS 5,257,856 A * 11/1993 Ota ................... B60G 17/0195
180/219
5,816,670 A * 10/1998 Yamada .............. B60T 8/17636
303/194
(Continued)

FOREIGN PATENT DOCUMENTS

DE 102005018484 10/2006
EP 2161172 3/2010
(Continued)

OTHER PUBLICATIONS

European Search Report for EP application No. 18161722.6-1012 dated Aug. 16, 2018, 7 pages.
(Continued)

*Primary Examiner* — Anne Marie Antonucci
*Assistant Examiner* — Sahar Motazedi
(74) *Attorney, Agent, or Firm* — Andrew M. Calderon; Roberts Calderon Safran & Cole, P.C.

(57) ABSTRACT

A brake fluid pressure control device for vehicles with bar handle, includes: an acceleration acquiring unit which is configured to acquire acceleration that occurs in the vehicle; and a control unit which is configured to judge a probability of occurrence of a rear-wheel lift based on the acceleration acquired by the acceleration acquiring unit, and which is configured to perform a pressure reduction control on a front wheel brake when judging that the occurrence of the rear-wheel lift is probable, the control unit which is configured to adjust a degree of pressure reduction of the pressure reduction control based on a differentiation value of the acceleration acquired by the acceleration acquiring unit.

18 Claims, 9 Drawing Sheets

(51) Int. Cl.
  *B60T 8/32* (2006.01)
  *B60T 8/50* (2006.01)
  *B60T 8/26* (2006.01)
  *B60T 7/10* (2006.01)
  *B62L 3/02* (2006.01)

(52) U.S. Cl.
  CPC .......... *B60T 8/3205* (2013.01); *B60T 8/3225* (2013.01); *B60T 8/50* (2013.01); *B60T 7/102* (2013.01); *B60T 2230/03* (2013.01); *B60T 2240/06* (2013.01); *B62L 3/023* (2013.01)

(56) References Cited

U.S. PATENT DOCUMENTS

| | | | | |
|---|---|---|---|---|
| 8,272,699 | B2* | 9/2012 | Imura | B60T 8/1755 303/146 |
| 8,800,709 | B2* | 8/2014 | Watanabe | B60T 8/17554 180/282 |
| 2003/0066720 | A1* | 4/2003 | Sakamoto | B60T 8/1706 188/177 |
| 2004/0167701 | A1* | 8/2004 | Mattson | B60G 17/0162 701/71 |
| 2007/0273202 | A1* | 11/2007 | Ogawa | B60T 8/3225 303/113.2 |
| 2008/0125948 | A1* | 5/2008 | Matsuda | B60T 8/172 701/83 |
| 2009/0037063 | A1* | 2/2009 | Ogawa | B60T 8/1706 701/70 |
| 2009/0079258 | A1* | 3/2009 | Tsuruhara | B60T 8/1706 303/9.61 |
| 2011/0024249 | A1* | 2/2011 | Nishikawa | B60T 7/042 188/349 |
| 2014/0214300 | A1* | 7/2014 | Hasegawa | B60T 8/50 701/79 |
| 2015/0232074 | A1* | 8/2015 | Iizuka | B60T 8/172 701/34.1 |
| 2018/0362010 | A1* | 12/2018 | Yildirim | B60T 8/1706 |
| 2019/0016317 | A1* | 1/2019 | Masuda | B60T 8/17 |

FOREIGN PATENT DOCUMENTS

| | | |
|---|---|---|
| JP | 5887284 | 3/2016 |
| WO | 2007086135 A1 | 6/2009 |

OTHER PUBLICATIONS

Japanese Office Action for Japanese Application No. 2017-049130 dated Aug. 6, 2019, 9 pages.

* cited by examiner

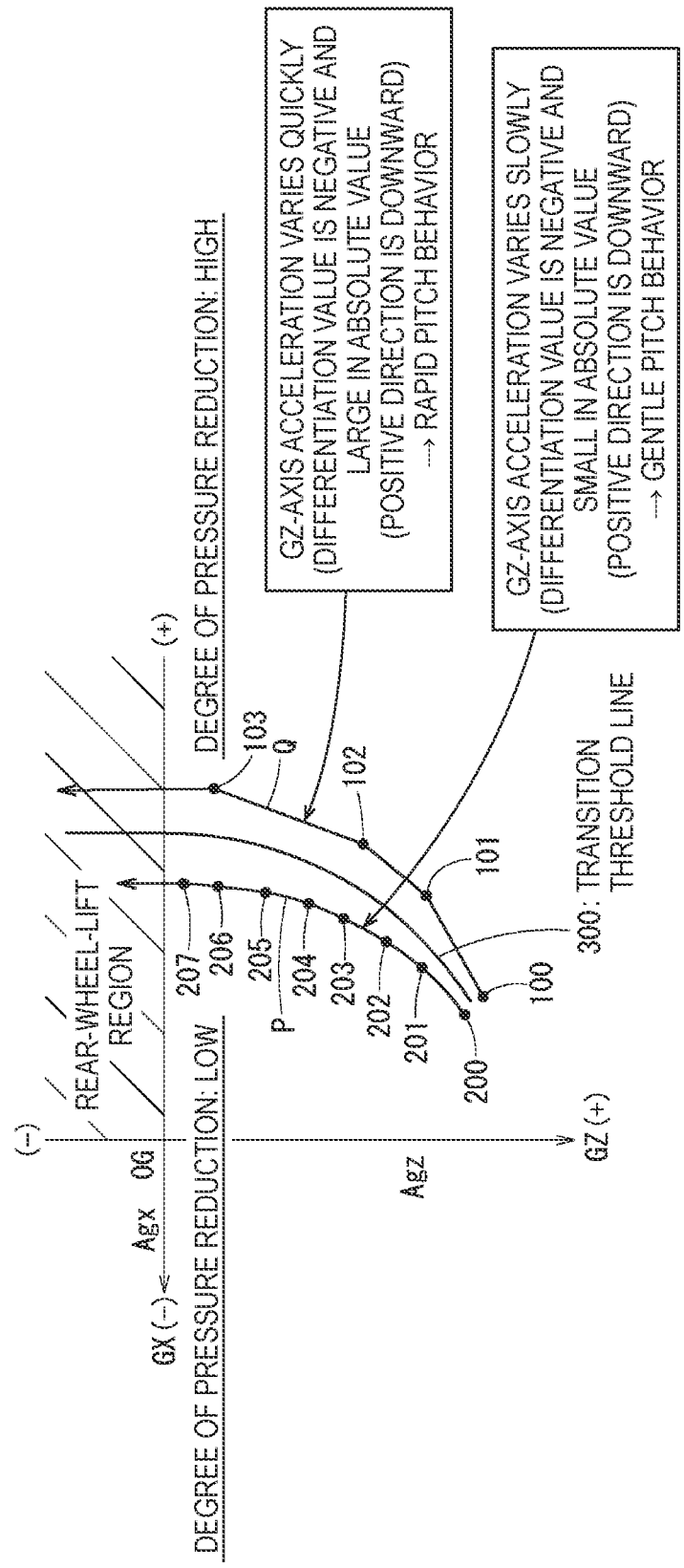

BRAKE FLUID PRESSURE CONTROL DEVICE FOR VEHICLES WITH BAR HANDLE

CROSS-REFERENCE TO RELATED APPLICATION

This application claims priority from Japanese Patent Application No. 2017-049130, filed on Mar. 14, 2017, the entire subject matter of which is incorporated herein by reference.

TECHNICAL FIELD

The present invention relates to a brake fluid pressure control device for vehicles with bar handle which controls the fluid pressure of a wheel brake at the time of braking to suppress a rear-wheel lift of a vehicle having a bar handle (hereinafter referred to as a vehicle with bar handle) such as a motorcycle or a motor tricycle.

BACKGROUND

What is called a rear-wheel lift phenomenon (hereinafter referred to as a rear-wheel lift) that the rear wheel lifts up at the time of sudden braking sometimes occurs in vehicles with bar handle. A vehicle running in a rear-wheel lift state is unstable in vehicle behavior. Japanese Patent No. 5887284 discloses a technique for suppressing a rear-wheel lift.

In Japanese Patent No. 5887284, the probability of occurrence of a rear-wheel lift is judged on the basis of an output (i.e., acceleration) of an acceleration sensor that is attached to a vehicle with bar handle. If it is judged that a rear-wheel lift is going to occur or has occurred, it is suppressed by performing a pressure reducing control on the front wheel brake (refer to Paragraph 0067 of Japanese Patent No. 5887284).

As described above, in Japanese Patent No. 5887284, the probability of occurrence of a rear-wheel lift is judged using the acceleration sensor that is attached to the vehicle with bar handle.

Incidentally, when a rear-wheel lift is started during braking, the rear wheel of a vehicle with bar handle lifts up due to inertia (centrifugal force) with a ground contact point of the front wheel as a rotation center. Since such lifting-up behavior is not uniform, the degree of pressure reduction needs to be adjusted so as to be suitable for the behavior of each rear-wheel lift.

However, in the above technique, the degree of pressure reduction is not adjusted according to rear-wheel lift behavior. The technique has room for improvement in this respect.

SUMMARY

The present invention has been made in view of the above problems, and an object of the invention is therefore to provide a brake fluid pressure control device for vehicles with bar handle capable of properly adjusting the degree of pressure reduction of a fluid pressure control for suppression of a rear-wheel lift according to its behavior.

According to an aspect of the invention, there is provided a brake fluid pressure control device for vehicles with bar handle, the brake fluid pressure control device comprising: an acceleration acquiring unit which is configured to acquire acceleration that occurs in the vehicle; and a control unit which is configured to judge a probability of occurrence of a rear-wheel lift based on the acceleration acquired by the acceleration acquiring unit, and which is configured to perform a pressure reduction control on a front wheel brake when judging that the occurrence of the rear-wheel lift is probable, the control unit which is configured to adjust a degree of pressure reduction of the pressure reduction control according to a differentiation value of the acceleration acquired by the acceleration acquiring unit.

BRIEF DESCRIPTION OF THE DRAWINGS

FIG. 9 illustrates a GX-GZ map that enables detection of transitions of an acceleration signal.

DETAILED DESCRIPTION (Configuration)

Figure 1:
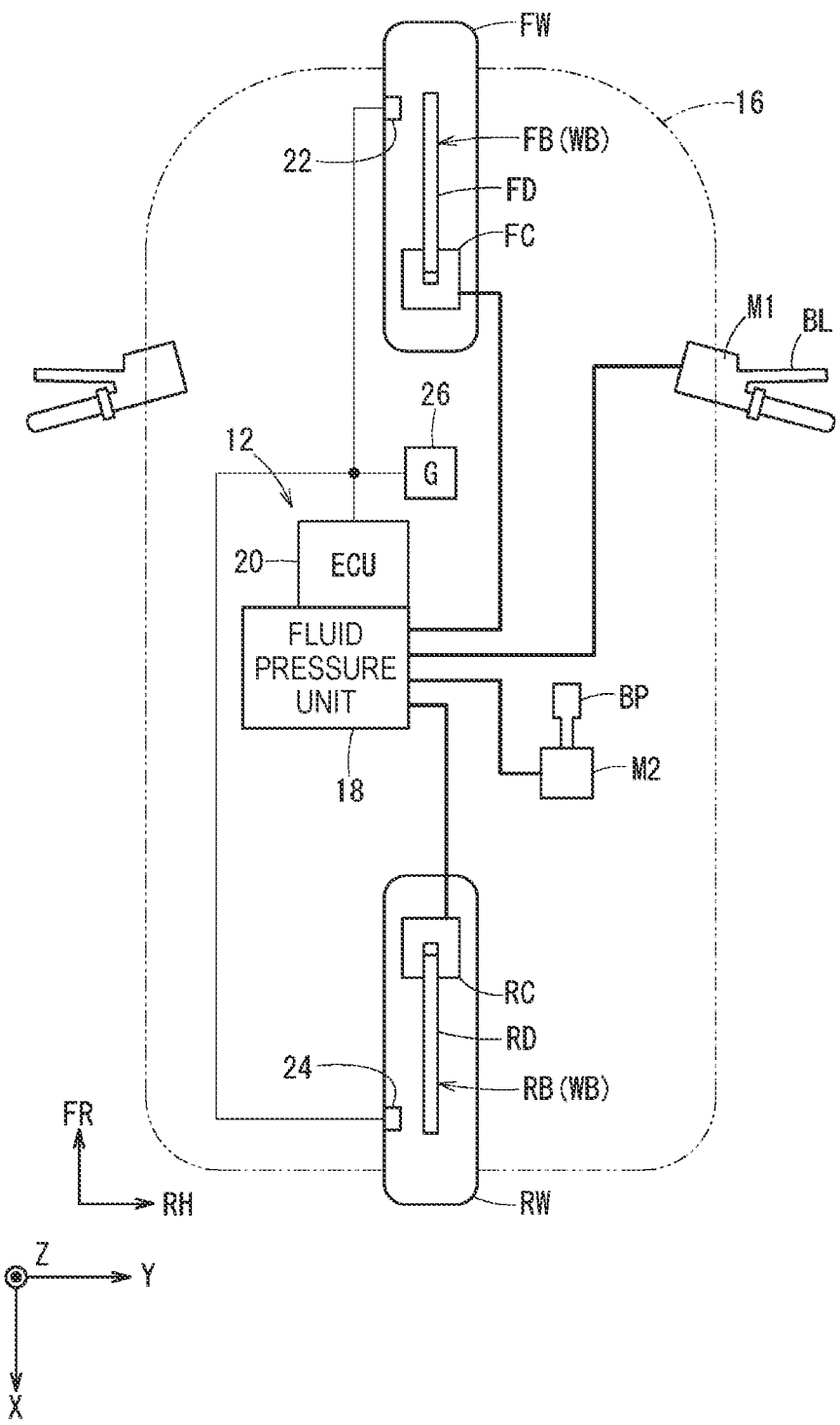
FIG. 1 shows a rough configuration of a brake fluid pressure control device for vehicles with bar handle according to an embodiment that incorporates a device for adjusting the degree of pressure reduction of a fluid pressure control.

FIG. 1 is a schematic plan view of a vehicle with bar handle 14 (may be abbreviated as a "vehicle 14") such as a motorcycle and shows a rough configuration of a brake fluid pressure control device for vehicles with bar handle (also referred to as a "brake fluid pressure control device") 12 according to an embodiment that is installed in the vehicle 14. As described later, the brake fluid pressure control device 12 incorporates a fluid pressure control start timing control device 10.

The arrows X, Y, and Z shown in FIG. 1 and following figures indicate the X axis, Y axis, and Z axis which represent the front-rear direction, left-right direction, and vertical direction of a vehicle 14, respectively. And the arrows FR, RH, and UP shown in FIG. 1 and following figures indicate the forward direction (parallel with the X axis), the rightward direction (parallel with the Y axis), and the upward direction (parallel with the Z axis) of the vehicle 14, respectively.

The vehicle 14 is equipped with a front wheel FW and a rear wheel RW which are suspended on suspensions of a vehicle body 16.

The brake fluid pressure control device 12 is mainly equipped with a fluid pressure unit 18 having fluid passages (flow passages of a brake fluid) and various components and an ECU (electronic control unit) 20 which is a control device for controlling the various components of the fluid pressure unit 18 as appropriate. In FIG. 1, fluid passages are drawn by thick solid lines and electric wires are drawn by thin solid lines.

The front wheel FW is provided with a front wheel brake FB and the rear wheel RW is provided with a rear wheel brake RB. The front wheel brake FB and the rear wheel brake RB are together referred to as wheel brakes WB (FB, RB). The front wheel brake FB is composed of a brake disc FD and brake calipers (also referred to as front wheel calipers) FC, and the rear wheel brake RB is composed of a brake disc RD and brake calipers (also referred to as rear wheel calipers) RC.

A brake lever BL for activating the front wheel brake FB is provided with a front wheel master cylinder M1, and a brake pedal BP for activating the rear wheel brake RB is provided with a rear wheel master cylinder M2. The brake lever BL and the brake pedal BP are manipulated by a rider.

Electrically connected to the ECU 20 are a front wheel speed sensor 22 for detecting a wheel speed of the front wheel FW (front wheel speed) Vf and a rear wheel speed sensor 24 for detecting a wheel speed of the rear wheel RW (rear wheel speed) Vr and an acceleration sensor (also referred to as a G sensor, a 3-axis acceleration sensor, or a 3-axis G sensor) 26 for detecting acceleration values of the vehicle 14 in the three orthogonal axes X, Y, and Z.

Figure 2:
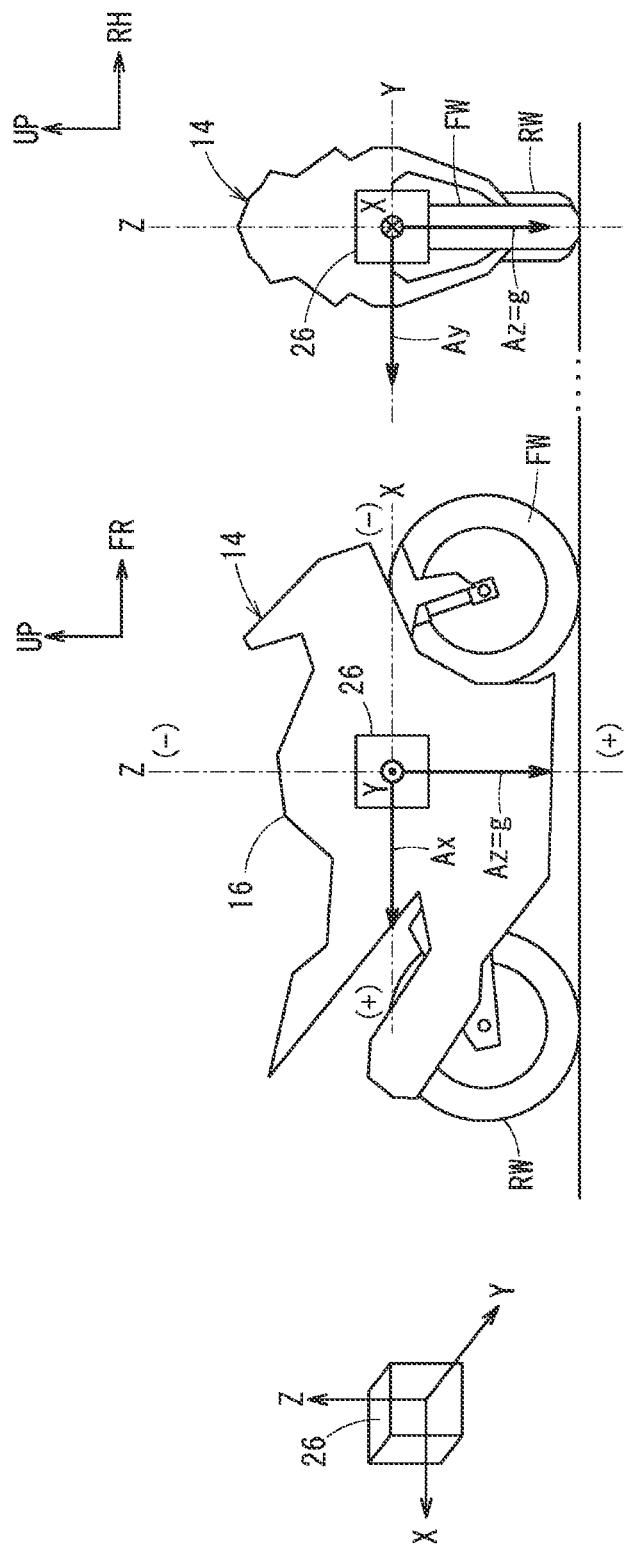
FIG. 2 illustrates how an acceleration sensor is installed in a vehicle.

As shown in FIG. 2, the acceleration sensor 26 is attached to the vehicle body 16 at, for example, its center-of-gravity position and detects acceleration (X-axis acceleration) Ax in the X-axis direction (front-rear direction), acceleration (Y-axis acceleration) Ay in the Y-axis direction (left-right direction), and acceleration (Z-axis acceleration) Az in the Z-axis direction (vertical direction) of the vehicle 14.

As for the signs of acceleration values Ax, Ay, and Az detected by the acceleration sensor 26 being attached to the vehicle body 16, the directions indicated by arrows in the middle part and the right part of FIG. 2 are positive directions.

More specifically, acceleration Ax directed rearward relative to the vehicle 14 is positive and acceleration Ax directed forward relative to the vehicle 14 is negative.

Acceleration Ay directed leftward relative to the vehicle 14 in a front view is positive and acceleration Ay directed rightward relative to the vehicle 14 in a front view is negative.

Acceleration Az directed downward relative to the vehicle 14 is positive and acceleration Az directed upward relative to the vehicle 14 is negative.

The acceleration of gravity g is detected as +1 G (Az=1 G=g) in the Z-axis direction. In the left part of FIG. 2, the acceleration sensor 26 is drawn in perspective so that the three orthogonal axes (X, Y, and Z axes) can be recognized visually.

An installation position, the origin of the three orthogonal coordinate axes, and inclinations with respect to the horizontal direction and the vertical direction can be set in a desired manner. Where they are set in a desired manner, an appropriate measure to take is to correct detection values for them using known offset values (refer to paragraph 0034 and FIG. 5 of Japanese Patent No. 5887284, for example).

(Brake Fluid Pressure Circuit)

Figure 3:
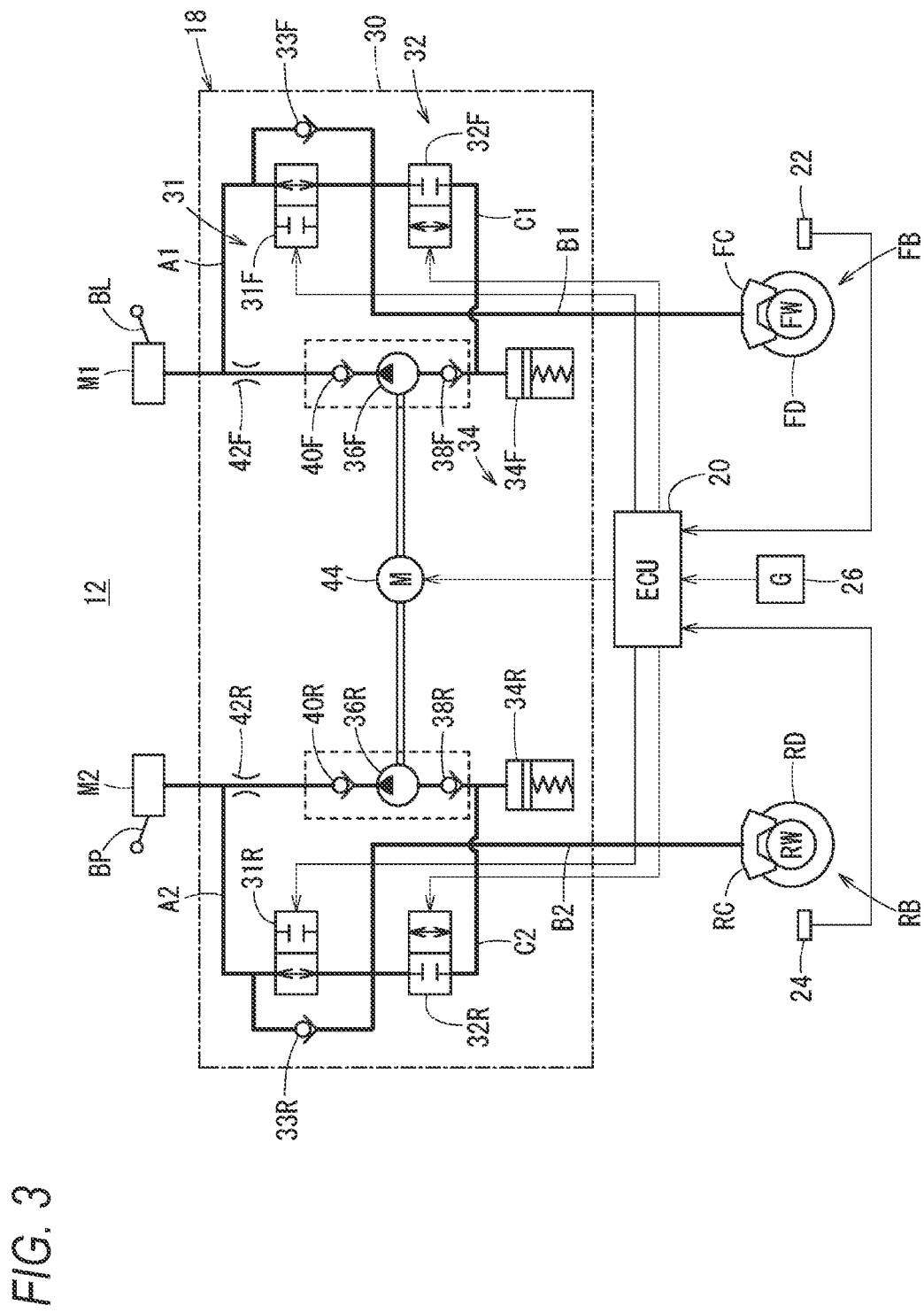
FIG. 3 shows a brake fluid pressure passage of the brake fluid pressure control device for vehicle with bar handle.

FIG. 3 shows a brake fluid pressure passage of the brake fluid pressure control device 12. In FIG. 3, fluid passages are drawn by thick solid lines and electric wires are drawn by thin solid lines. The double line represents a shaft.

Referring to FIG. 3, the ECU 20, which is equipped with a CPU, a RAM, a ROM, and an input/output circuit, performs a fluid pressure control by performing various kinds of computation according to input signals from the acceleration sensor 26 and wheel speed sensors 22 and 24 and programs and data stored in the ROM.

The front wheel calipers FC are a fluid pressure device for converting a brake fluid pressure generated by the front wheel master cylinder M1 and the brake fluid pressure control device 12 into an actuation force for the front wheel brake FB provided for the front wheel FW.

The rear wheel calipers RC are a fluid pressure device for converting a brake fluid pressure generated by the rear wheel master cylinder M2 and the brake fluid pressure control device 12 into an actuation force for the rear wheel brake RB provided for the rear wheel RW.

The front wheel calipers FC and the rear wheel calipers RC are connected to the fluid pressure unit 18 by respective pipes.

(Fluid Pressure Unit 18 of Brake Fluid Pressure Control Device 12)

As shown in FIG. 3, the fluid pressure unit 18 of the brake fluid pressure control device 12 is disposed between the front wheel master cylinder M1 and the front wheel brake FB and between the rear wheel master cylinder M2 and the rear wheel brake RB.

The fluid pressure unit 18 includes a body 30 which is a base body having fluid passages through which a brake fluid is to flow, plural input valves 31 (31F, 31R) and plural output valves 32 (32F, 32R) which are disposed in the fluid passages formed in the body 30, and other things.

The front wheel master cylinder M1 is connected to the front wheel calipers FC via a front wheel master cylinder M1-side fluid passage A1 and a wheel-side fluid passage B1 which are formed in the body 30.

The rear wheel master cylinder M2 is connected to the rear wheel calipers RC via a rear wheel master cylinder M2-side fluid passage A2 and a wheel-side fluid passage B2 which are formed in the body 30.

The fluid passage A1 which is connected to the front wheel master cylinder M1 communicates with the front wheel calipers FC via an input valve 31F and the fluid passage B1 in an ABS non-activated state in which an ABS (antilock braking system) control is not started.

The front wheel master cylinder M1 generates a brake fluid pressure corresponding to a force that the rider applies to the brake lever BL. In an ABS non-activated state, a force applied to the brake lever BL is transmitted to the front wheel brake FB in the form of that brake fluid pressure.

Likewise, the fluid passage A2 which is connected to the rear wheel master cylinder M2 communicates with the rear wheel calipers RC via an input valve 31R and the fluid passage B2 in an ABS non-activated state in which an ABS control is not started.

The rear wheel master cylinder M2 generates a brake fluid pressure corresponding to a force that the rider applies to the brake pedal BP. In an ABS non-activated state, a force applied to the brake pedal BP is transmitted to the rear wheel brake RB in the form of that brake fluid pressure.

In the body 30, an output valve 32F and a check valve 33F, in addition to the input valve 31F, are disposed on the fluid passages A1 and B1 which connect the front wheel master cylinder M1 and the front wheel calipers FC.

In the body 30, an output valve 32R and a check valve 33R, in addition to the input valve 31R, are disposed on the fluid passages A2 and B2 which connect the rear wheel master cylinder M2 and the rear wheel calipers RC.

Furthermore, in the body 30, a reservoir 34F, a pump 36F, a suction valve 38F, a discharge valve 40F, and an orifice 42F are provided so as to correspond to the front wheel master cylinder M1.

In the body 30, a reservoir 34R, a pump 36R, a suction valve 38R, a discharge valve 40R, and an orifice 42R are provided so as to correspond to the rear wheel master cylinder M2.

The fluid pressure unit 18 is equipped with a motor 44 for driving the two pumps 36 (36F, 36R). The rotary shaft of the motor 44 drives the pumps 36F and 36R.

The input valves 31F and 31R, which are normally-open electromagnetic valves, are disposed between the front wheel master cylinder M1 and the front wheel calipers FC (i.e., between the fluid passages A1 and B1) and between the rear wheel master cylinder M2 and the rear wheel calipers RC (i.e., between the fluid passages A2 and B2), respectively.

In an ABS non-activated state, each of the input valves 31F and 31R is open and thereby allows transmission of a brake fluid pressure from the front wheel master cylinder M1 to the front wheel calipers FC or from the rear wheel master cylinder M2 to the rear wheel calipers RC.

In an ABS-activated state, each of the input valves 31F and 31R is closed by the ECU 20 when the front wheel FW or the rear wheel RW is nearly locked, thus interrupting transmission of a fluid pressure from the brake lever BL (front wheel master cylinder M1) to the front wheel brake FB or from the brake pedal BP (rear wheel master cylinder M2) to the rear wheel brake RB.

The output valves 32F and 32R, which are normally-closed electromagnetic valves, are disposed between the front wheel calipers FC and the reservoir 34F (i.e., on the fluid passage (open passage) C1) and between the rear wheel calipers RC and the reservoir 34R (i.e., on the fluid passage (open passage) C2), respectively.

The output valves 32F and 32R are closed in an ABS non-activated state. In an ABS-activated state, each of the output valves 32F and 32R is opened by the ECU 20 when the front wheel FW or the rear wheel RW is nearly locked, thus allowing part of a brake fluid pressure to escape to the reservoir 34F or 34R instead of being applied to the front wheel brake FB or the rear wheel brake RB (pressure reduction control). In a state that an ABS control is being made and the output valves 32F and 32R are closed, if the input valve 31F or 31R is closed by the ECU 20 when the front wheel FW or the rear wheel RW is nearly locked, a brake fluid pressure being applied to the front wheel brake FB or the rear wheel brake RB is maintained (holding control).

The check valves 33F and 33R are connected in parallel to the respective input valves 31F and 31R. Each of the check valves 33F and 33R is a valve that allows only inflow of a brake fluid from the front wheel calipers FC to the front wheel master cylinder M1 or from the rear wheel calipers RC to the rear wheel master cylinder M2. Also in a state that the input valve 31F or 31R is closed after cancellation of an input from the brake lever BL or the brake pedal BP, the check valve 33F or 33R allows inflow of the front wheel calipers FC to the front wheel master cylinder M1 or from the rear wheel calipers RC to the rear wheel master cylinder M2.

The reservoirs 34 (34F, 34R) have a function of storing escape brake fluids when the output valves 32 (32F, 32R) are opened, respectively.

Equipped with the suction valve 38F or 38R and the discharge valve 40F or 40R (enclosed by a broken-line frame in FIG. 3), each of the pumps 36F and 36R has a function of sucking a brake fluid stored in the upstream reservoir 34F or 34R and returning (discharges) it to the downstream front wheel master cylinder M1 or rear wheel master cylinder M2.

That is, the suction valves 38F and 38R are valves for allowing only inflow (suction) of brake fluids to the upstream sides from the reservoirs 34F and 34R to the pumps 36F and 36R, respectively.

On the other hand, the discharge valves 40F and 40R are valves for allowing only outflow (discharge) of brake fluids from the sides downstream of the pumps 36F and 36R to the master cylinders M1 and M2, respectively.

A ripple component of a brake fluid being discharged to the master cylinder M1 or M2 via the discharge valve 40F or 40R is absorbed by the orifice 42F or 42R.

(Basic Operation of Brake Fluid Pressure Control Device 12)

A basic operation of the brake fluid pressure control device 12 will be described below. Since the basic operation of the brake fluid pressure control device 12 is the same as that of known brake fluid pressure control devices of the same kind, it will not be described below in detail but outlined.

When the brake lever BL and the brake pedal BP are manipulated to cause braking, a brake fluid having a fluid pressure corresponding to the manipulation on the brake lever BL is supplied from the front wheel master cylinder M1 to the cylinder of the front wheel calipers FC through the fluid pressure unit 18, whereby a braking force is given to the front wheel brake FB. At the same time, a brake fluid having a fluid pressure corresponding to the manipulation on the brake pedal BP is supplied from the rear wheel master cylinder M2 to the cylinder of the rear wheel calipers RC through the fluid pressure unit 18, whereby a braking force is given to the rear wheel brake RB. In this case, the fluid passages A1 and B1 communicate with each other and hence are at the same pressure and the fluid passages A2 and B2 communicate with each other and hence are at the same pressure.

If the ECU 20 judges, on the basis of a vehicle body speed Vv and slip ratios of the front wheel FW and the rear wheel RW, that a fluid pressure control such as an ABS control is necessary and also judges that, for example, the brake fluid pressures should be lowered, the output valves 32F and 32R are opened being energized by the ECU 20 and the input valves 31F and 31R are closed being energized by the ECU 20, whereupon a pressure reduction control (fluid pressure control) is started.

As a result, brake fluids are discharged from the calipers FC and RC to the reservoirs 34F and 34R via the output valves 32F and 32R and fluid passages C1 and C2, whereby the fluid pressures of the fluid passages B1 and B2, that is, the pressures of the calipers FC and RC (calipers pressures), are lowered. A fluid pressure control mode in which the calipers pressures are being lowered in this manner is referred to as a "pressure lowering mode."

Since the ECU 20 drives the motor 44 at the same time as energizes the output valves 32F and 32R, stored brake fluids are returned from the reservoirs 34F and 34R to the master cylinders M1 and M2.

If judging that current brake fluid pressures should be maintained, the ECU 20 closes the output valves 32F and 32R by deenergizing them. As a result, the fluid passages B1 and B2 on the side of the wheel brakes FB and RB are made not to communicate with the fluid passages A1 and A2 or C1 and C2, whereby the pressures of the brake calipers FC and RC (calipers pressures) are kept constant. A fluid pressure control mode in which the calipers pressures are kept constant is referred to as a "holding mode."

If judging that the fluid pressures should be elevated, the ECU 20 closes the output valves 32F and 32R by deenergizing them and adjusts the opening times of the input valves 31F and 31R by a duty control, whereby the calipers pressures are elevated gradually. A fluid pressure control mode in which the calipers pressures are being elevated is referred to as a "pressure elevation mode."

Fluid pressure controls of the above-described pressure lowering mode, holding mode, and pressure elevation mode are performed while selection is made between them as appropriate until it is judged that none of fluid pressure controls such as an ABS control are necessary.

(Device 10 for Adjusting the Degree of Pressure Reduction of a Fluid Pressure Control)

Figure 4:
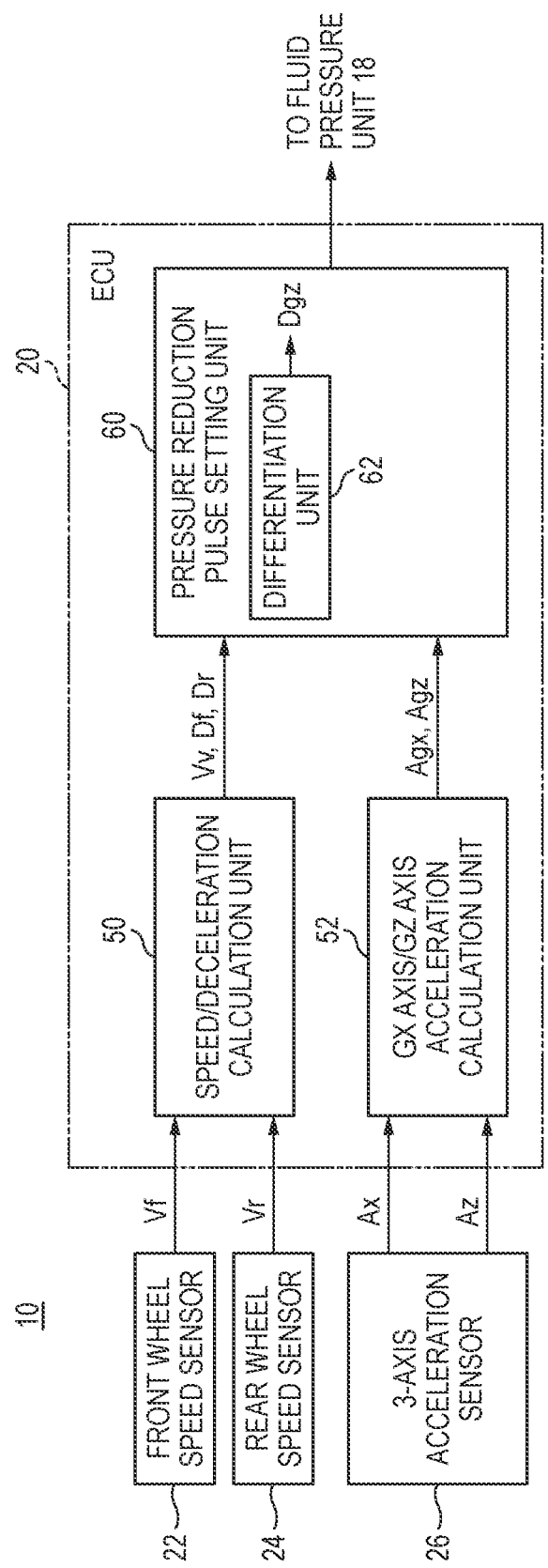
FIG. 4 is a block diagram showing the configuration of an essential part of the brake fluid pressure control device for vehicles with bar handle including the device for adjusting the degree of pressure reduction of a fluid pressure control.

FIG. 4 shows the configuration of an essential part of the brake fluid pressure control device 12 including the device 10 for adjusting the degree of pressure reduction of a fluid pressure control.

As shown in FIG. 4, the device 10 for adjusting the degree of pressure reduction of a fluid pressure control is composed of the ECU 20 and the front wheel speed sensor 22, the rear wheel speed sensor 24, and the 3-axis acceleration sensor 26 which are connected to the ECU 20.

The ECU 20 is composed of a pressure reduction pulse setting unit 60 and a speed/deceleration calculation unit 50 and a GX axis/GZ axis acceleration calculation unit 52 which are connected to the pressure reduction pulse setting unit 60. The pressure reduction pulse setting unit 60 is equipped with a differentiation unit 62.

The GZ axis and the GX axis which relate to a calculation performed by the GX axis/GZ axis acceleration calculation unit 52 will now be described with reference to FIG. 5. The GZ axis is the axis in the rear-wheel lift direction (also referred to as the "axis in a rear-wheel lift prediction direction"), and the GX axis is the axis that is perpendicular to the GZ axis in the vertical plane (XZ plane) that is the center plane of the vehicle body 16.

Figure 5:
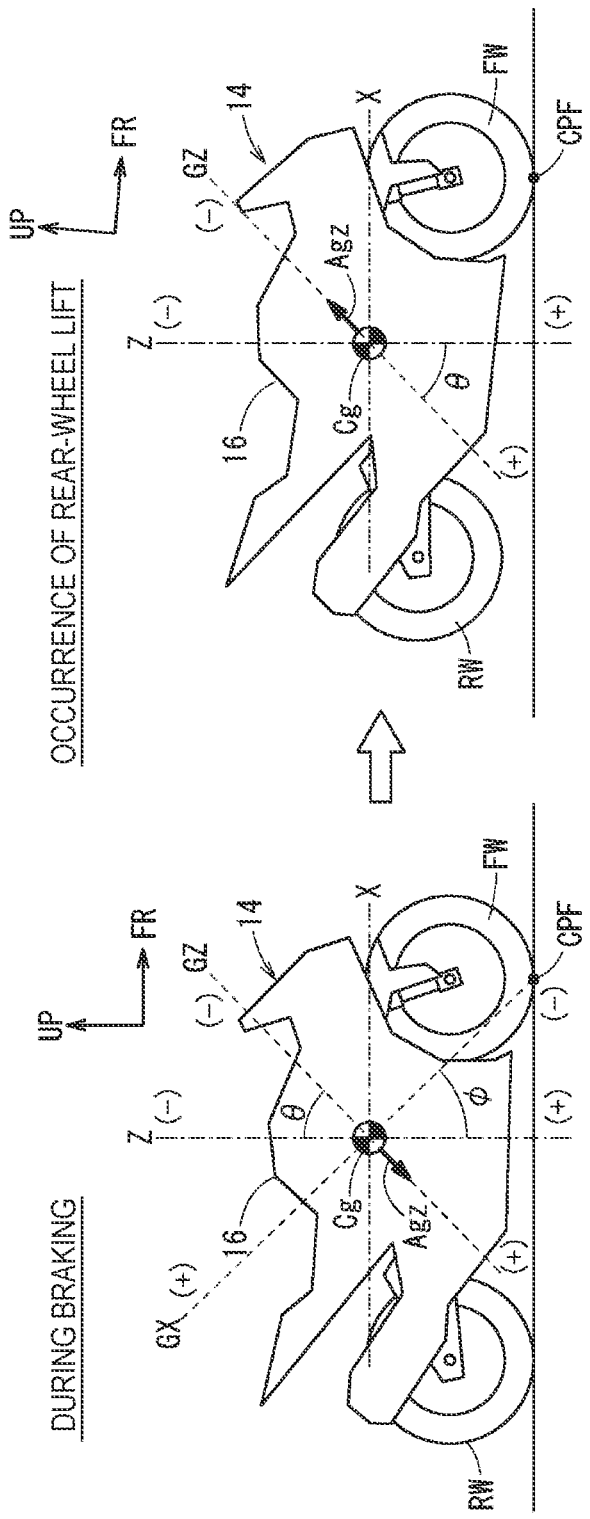
FIG. 5 illustrates an axis in a rear-wheel lift direction.

The left part of FIG. 5 shows a state of a running vehicle 14 that has started to decelerate and is under braking without a rear-wheel lift. In this state, the GX axis in the XZ plane (vertical plane) means the axis (represented by a straight broken line) that connects the center of gravity Cg of the vehicle 14 and a point CPF where the front wheel FW is in contact with the ground and that becomes a rotation center if a rear-wheel lift occurs in this state. The angle formed by the GX axis that coincides with the above straight line and the Z axis (vertical axis) is represented by φ (known calculated value).

The GZ axis is the axis that is perpendicular to the GX axis in the XZ plane. On the GZ axis, the directions extending obliquely downward and upward from the center of gravity Cg are defined as a positive direction and a negative direction, respectively.

As described later in describing a manner of calculation in detail, acceleration Agz on the GZ axis under braking without a rear-wheel lift is in the positive direction (directed obliquely downward) as shown in the left part of FIG. 5. And acceleration Agz on the GZ axis under braking with a rear-wheel lift (also referred to as "rear-wheel lift axis acceleration") is in the negative direction (directed obliquely upward) as shown in the right part of FIG. 5. Correctly, when the vehicle 14 is inclined forward by a rear-wheel lift and the X axis, the Z axis, the GZ axis are inclined accordingly, the angle θ that is formed by the Z axis and the GZ axis (i.e., 90° (π/2)−φ); known value) in the left part of FIG. 5 becomes different from that in the right part of FIG. 5. However, practically, there are no problems even if it is considered that the angle θ is not changed by a rear-wheel lift. Thus, for the sake of convenience, such a change in angle θ is not reflected in the right part of FIG. 5. The criterion for judging occurrence of a rear-wheel lift is that the acceleration Agz on the GZ axis changes from a positive value to 0 G.

Returning to FIG. 4, the speed/deceleration calculation unit 50 calculates a vehicle body speed Vv, front wheel deceleration Df, and rear wheel deceleration Dr on the basis of a front wheel speed Vf that is output from the front wheel speed sensor 22 and a rear wheel speed Vr that is output from the rear wheel speed sensor 24 according to the following Equations (1) to (3), respectively:

$$Vv=(Vf+Vr)/2 \quad (1)$$

$$Df=\{Vf(\text{current front wheel speed})-Vf(\text{front wheel speed of a very short time }\Delta t\text{ ago})\}/\Delta t \quad (2)$$

$$Dr=\{Vr(\text{current rear wheel speed})-Vr(\text{rear wheel speed of a very short time }\Delta t\text{ ago})\}/\Delta t. \quad (3)$$

The GX axis/GZ axis acceleration calculation unit 52 calculates GX-axis acceleration Agx and GZ-axis acceleration Agz on the basis of X-axis acceleration Ax and Z-axis acceleration Az that are output from the 3-axis acceleration sensor 26 according to the following Equations (4) and (5), respectively:

$$Agx=Ax(GX)+Az(GX)=Ax\cos\theta+Az(GX)=Ax\cos\theta+Az\sin\theta \quad (4)$$

$$Agz=Az(GZ)+Ax(GZ)=-Az\cos\theta+Ax\sin\theta. \quad (5)$$

In Equations (4) and (5), Ax(GX) is the GX-axis component of the X-axis acceleration Ax, Az(GX) is the GX-axis component of the Z-axis acceleration (i.e., acceleration of gravity) Az, Az(GZ) is the GZ-axis component of the Z-axis acceleration (i.e., acceleration of gravity) Az, and Ax(GZ) is the GZ-axis component of the X-axis acceleration Ax.

Figure 6:
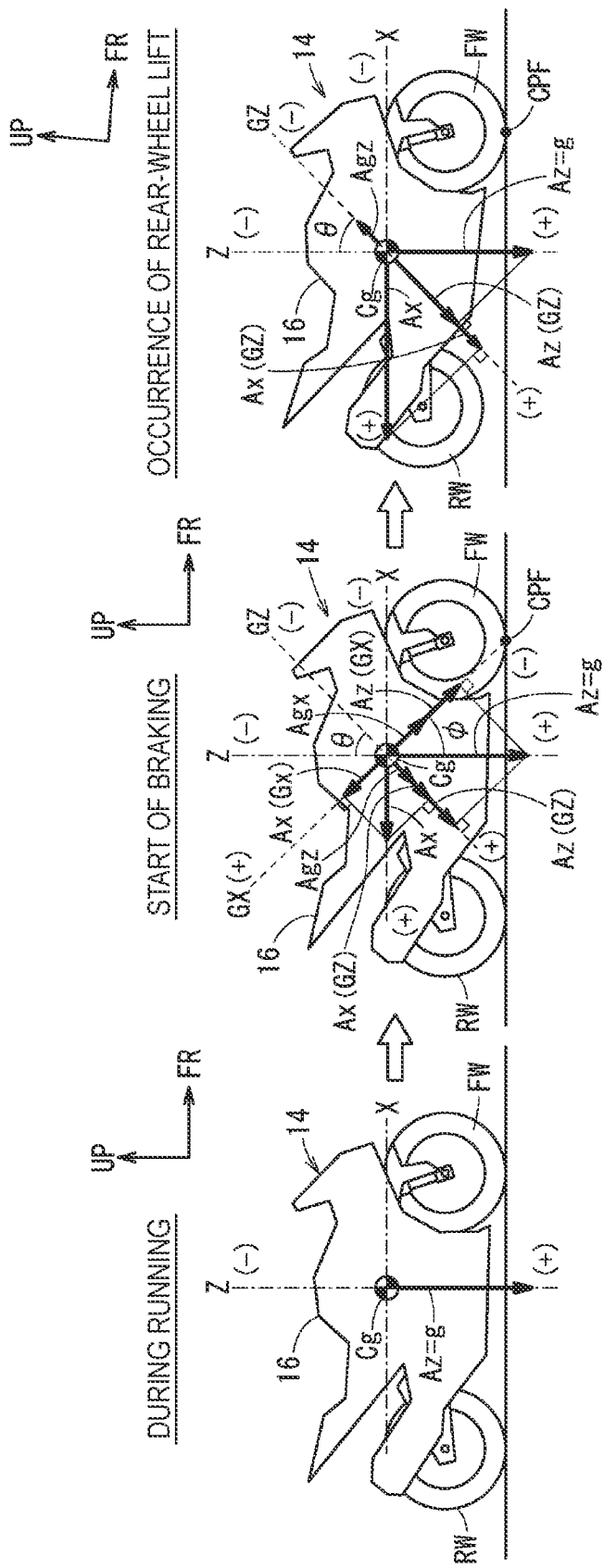
FIG. 6 is vector diagrams illustrating acceleration occurring in the axis in the rear-wheel lift direction.

As shown in the left vector diagram of FIG. 6, the acceleration Az acting on the center of gravity Cg of the vehicle 14 that is running at a constant speed is only the acceleration of gravity g that is directed downward in the Z axis (vertical direction) (i.e., Az=g).

That is, as long as the 3-axis acceleration sensor 26 is operating normally, the Z-axis acceleration Az and the X-axis acceleration Ax of the vehicle 14 that is running at a constant speed are detected to be g and 0, respectively.

After a start of braking on the vehicle 14 by a manipulation on the brake lever BL by the rider, as shown in the middle vector diagram of FIG. 6, X-axis acceleration Ax occurs and is detected by the 3-axis acceleration sensor 26 whereas the Z-axis acceleration Az remains equal to g.

Thus, as seen from the middle vector diagram of FIG. 6, the GX-axis component Ax(GX) of X-axis acceleration, the GX-axis component Az(GX) of Z-axis acceleration (i.e., acceleration of gravity) Az, GX-axis acceleration Agx, AX-axis acceleration Agx, the GZ-axis component Az(GZ) of Z-axis acceleration (i.e., acceleration of gravity) Az, the GZ-axis component Ax(GZ) of X-axis acceleration Ax, and GZ-axis acceleration Agz are calculated on the basis of X-axis acceleration Ax and Z-axis acceleration Az detected by the 3-axis acceleration sensor 26 according to the above Equations (4) and (5).

As shown in the right vector diagram of FIG. 6, a rear-wheel lift occurs when the GZ-axis acceleration Agz is in the negative direction and does not occur when the GZ-axis acceleration Agz is in the positive direction.

Returning to FIG. 4, as described below, the pressure reduction pulse setting unit 60 sets a predetermined parameter (a duty ratio in the case of pulse width modulation control or the number of pulses in the case of pulse number control) of pressure reduction pulses on the basis of the vehicle body speed Vv, the front wheel deceleration Df, and the rear wheel deceleration Dr that are acquired from the speed/deceleration calculation unit 50, the GX-axis acceleration Agx and the GZ-axis acceleration Agz that are acquired from the GX axis/GZ axis acceleration calculation unit 52, and a differentiation value Dgz obtained by differentiating the GZ-axis acceleration Agz by the differentiation unit 62. And the pressure reduction pulse setting unit 60 performs a drive control on the fluid pressure unit 18.

Figure 8:
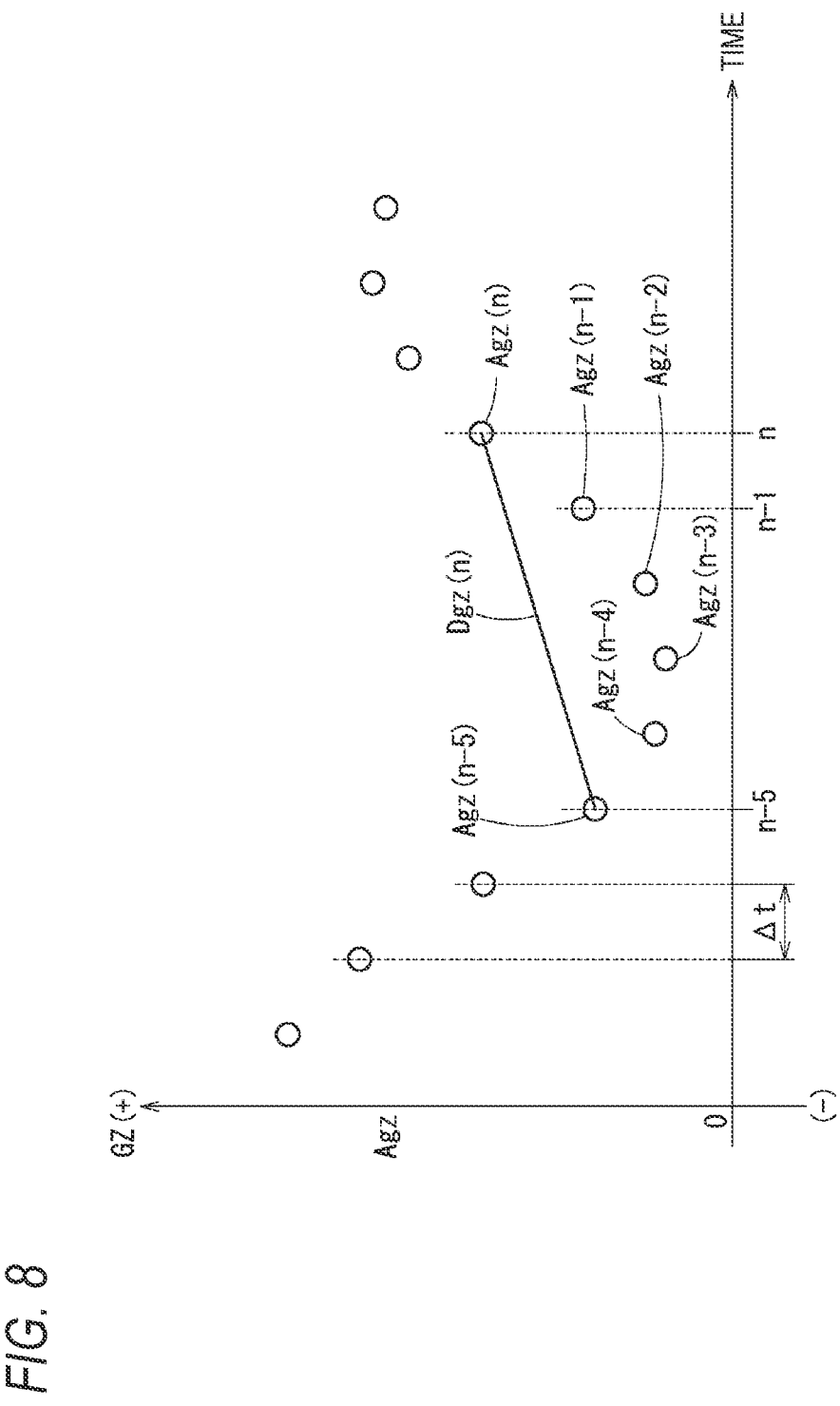
FIG. 8 illustrates an example differentiation value of GZ-axis acceleration.

FIG. 8 illustrates an example method for calculating a differentiation value Dgz(n) of GZ-axis acceleration Agz by the differentiation unit 62.

More specifically, as shown by the following Equation (6), a differentiation value Dgz(n) of GZ-axis acceleration Agz at a present time n is a quotient obtained by dividing the difference between an acceleration value Agz(n) at the present time n and an acceleration value Agz(n−5) at a time point (n−5) that is five times a prescribed time (five times a very short control time Δt) ago by five times the prescribed time (in the example of FIG. 8, Δt=10 (ms)).

$$Dgz(n)=\{Agz(n)-Agz(n-5)\}/(\Delta t \times 5) \tag{6}$$

It is confirmed that a differentiation value that properly reflects behavior of the vehicle 14 can be obtained by calculating a differentiation value Dgz(n) of GZ-axis acceleration Agz at a present time n using an acceleration value Agz(n) at the present time n and an acceleration value Agz(n−5) at a time point (n−5) that is five times a prescribed time ago. A response that is suitable for each vehicle type can be obtained by setting a proper integer as the multiplier for each vehicle type.

(Operation of Device 10 for Adjusting the Degree of Pressure Reduction of a Fluid Pressure Control)

Figure 7:
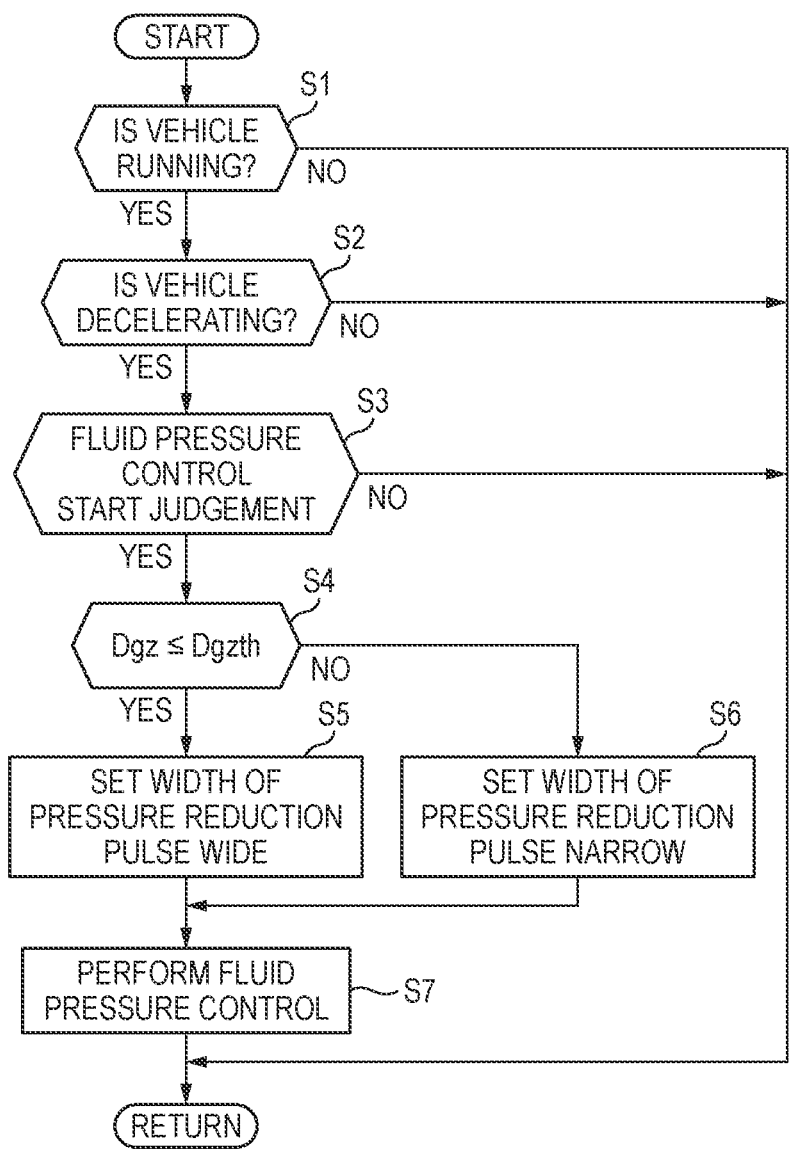
FIG. 7 is a flowchart for description of a process that is executed by the device for adjusting the degree of pressure reduction of a fluid pressure control which is a part of the brake fluid pressure control device for vehicles with bar handle according to the embodiment.

Next, the operation of the device 10 for adjusting the degree of pressure reduction of a fluid pressure control which is a part of the brake fluid pressure control device 12 according to the embodiment will be described with reference to a flowchart of FIG. 7. The process of this flowchart is executed by the CPU of the ECU 20. This process is executed repeatedly every short control time Δt that is on the order of milliseconds.

At step S1, the ECU 20, which also functions as a judging means for judging whether the vehicle 14 is running or stopped, judges whether the vehicle 14 is running or stopped.

More specifically, the ECU 20 calculates a vehicle body speed Vv according to Equation (1) on the basis of a front wheel speed Vf detected by the front wheel speed sensor 22 and a rear wheel speed Vr detected by the rear wheel speed sensor 24. The ECU 20 judges that the vehicle 14 is running if the calculated vehicle body speed Vv is higher than or equal to a predetermined speed threshold value Vth at which the vehicle 14 is regarded as approximately stopped, and judges that the vehicle 14 is not running if the calculated vehicle body speed Vv is lower than the speed threshold value Vth.

Alternatively, the ECU 20 may judge whether the vehicle 14 is running or stopped not on the basis of a vehicle body speed Vv but on the basis of one of a front wheel speed Vf detected by the front wheel speed sensor 22 or a rear wheel speed Vr detected by the rear wheel speed sensor 24.

If judging that Vv<Vth and hence the vehicle 14 is not running (S1: no), the ECU 20 finishes the process of this time and returns to step S1.

On the other hand, if judging that the vehicle 14 is running (S1: yes), the ECU 20 judges at step S2 whether the vehicle 14 is decelerating by judging whether estimated vehicle body deceleration Db calculated according to the following Equation (7) is negative (Db<0).

$$Db=\{Vv(\text{current vehicle body speed})-Vv(\text{vehicle body speed of a very short time } \Delta t \text{ ago})\}/\Delta t \tag{7}$$

The vehicle body deceleration Db is calculated by the speed/deceleration calculation unit 50.

At step S3, the ECU 20 plots, on a GX-GZ coordinate plane shown in FIG. 9, a combination of GX-axis acceleration Agx and GZ-axis acceleration Agz that are calculated on the basis of output signals of the acceleration sensor 26 according to the above Equations (4) and (5) and judges whether to start a fluid pressure control. If judging that a fluid pressure control should be started, the ECU 20 determines the degree of pressure reduction at steps S4-S6.

In the GX-GZ map shown in FIG. 9, the vertical axis is the GZ axis (the positive direction is the downward direction) and the horizontal axis is the GX axis (the positive direction is the rightward direction). If the point (operating point) (GX, GZ) is in a region of Agx≥0 and Agz≤0 on the GX-GZ coordinate plane, a rear-wheel lift occurs in the vehicle 14. Thus, this region is referred to as a "rear-wheel lift region."

Characteristic Q indicates that the GZ-axis acceleration Agz decreases quickly and the behavior of the vehicle 14 changes fast in the rear-wheel lift direction as the point (Agx, Agz) starts from point 100 (corresponding to a running state before a start of a fluid pressure control) and passes point 101, point 102, and point 103 in this order (interval: the very short control time Δt). In other words, the pitch behavior of the vehicle 14 is quick, that is, the differentiation value Dgz is negative (i.e., the behavior is in the rear-wheel lift direction) and has a large absolute value (the positive direction of the GZ axis is obliquely downward).

On the other hand, characteristic P indicates that the GZ-axis acceleration Agz decreases slowly and the behavior of the vehicle 14 changes slowly in the rear-wheel lift direction as the point (Agx, Agz) starts from point 200 (corresponding to a running state before a start of a fluid pressure control) and passes point 201, . . . , point 207 in this order (interval: the very short control time Δt). In other words, the pitch behavior of the vehicle 14 is slow, that is, the differentiation value Dgz is negative (i.e., the behavior is in the rear-wheel lift direction) and has a small absolute value (the positive direction of the GZ axis is obliquely downward).

A transition threshold line is defined as characteristic 300 that is located approximately at the middle of characteristics Q and P. As described later, as a result, the degree of pressure reduction of a pressure reduction control is set higher in the rapid behavior region that is on the right of the transition threshold line 300 (the threshold line on the map) than in the gentle behavior region that is on the left of the transition threshold line 300.

As described above, a manner of transition of acceleration signals can be detected using the GX-GZ map.

At step S3, it is judged that a fluid pressure control is necessary (S3: yes) if the GZ-axis acceleration Agz has become small and come close to 0 G.

Subsequently, to set (determine) the degree of pressure reduction of a pressure reduction control, whether the behavior of the vehicle 14 in the rear-wheel lift direction is rapid or gentle by calculating a differential value Dgz of GZ-axis acceleration Agz according to Equation (6).

A differential value of GX-axis acceleration Agx may be used instead of a differential value Dgz of GZ-axis acceleration Agz.

At step S4, a differential value Dgz of GZ-axis acceleration Agz is calculated and it is judged whether the calculated differential value Dgz is smaller than or equal to a threshold value Dgzth (i.e., Dgz≤Dgzth).

If it is judged at step S4 that the differential value Dgz of the GZ-axis acceleration Agz (i.e., the variation rate of the acceleration Agz with respect to time) is smaller than or equal to the threshold value Dgzth (i.e., Dgz≤Dgzth; Dgz, Dgzth<0) (S4: yes), at step S5 the pulse width of pressure reduction pulses is set wide (the degree of pressure reduction is set high). On the other hand, if it is judged at step S4 that the differential value Dgz of the GZ-axis acceleration Agz is larger than the threshold value Dgzth (i.e., Dgz>Dgzth; Dgz, Dgzth<0) (S4: no), at step S6 the pulse width of pressure reduction pulses is set narrow (the degree of pressure reduction is set low). At step S7, a fluid pressure control on the fluid pressure unit 18 is performed using the thus-set degree of pressure reduction.

Instead of setting the degree of pressure reduction (i.e., the pulse width of pressure reduction pulses) through comparison with the threshold value Dgzth, the device 10 for adjusting the degree of pressure reduction of a fluid pressure control may be configured so as to increase the degree of pressure reduction proportionally as the differential value Dgz of the GZ-axis acceleration Agz becomes smaller. The behavior of the vehicle 14 in the rear-wheel lift direction becomes faster as the differential value Dgz of the GZ-axis acceleration Agz becomes smaller. Thus, the behavior of the vehicle 14 can be suppressed more properly by increasing the degree of pressure reduction proportionally as the differential value Dgz becomes smaller.

(Rear-Wheel Lift Suppressing Operation of Device 10 for Adjusting the Degree of Pressure Reduction of a Fluid Pressure Control)

The right part of FIG. 6 shows a state that a rear-wheel lift has occurred. As described above, GZ-axis acceleration Agz calculated according to the above Equation (5) has a negative value (Agz<0 G).

An operating point (Agx, Agz) determined by GX-axis acceleration Agx and GZ-axis acceleration Agz that are calculated by the GX axis/GZ axis acceleration calculation unit 52 according to Equations (4) and (5) on the basis of X-axis acceleration Ax and Z-axis acceleration Az that are detected by the acceleration sensor 26 when the vehicle 14 is being decelerated, that is, the brake lever BL and the brake pedal BP, for example, are being manipulated, (input valves 31: open, output valves 32: closed), is plotted on the GX-GZ map shown in FIG. 9. If tendency toward occurrence of a rear-wheel lift is found, the input valve 31F on the front wheel FW side is closed and the output valve 32F on the front wheel FW side is opened by the ECU 20, whereby a control for reducing the pressure acting on the front wheel calipers FC (front wheel calipers pressure) is started.

In this pressure reduction control, a relationship between a differentiation value Dgz of GZ-axis acceleration Agz and the threshold value Dgzth is judged. If the condition Dgz≤Dgzth is satisfied, the behavior of the vehicle 14 is judged rapid and the valve opening duty cycle for the output valve 32F is increased to reduce the fluid pressure more. On the other hand, if the condition Dgz>Dgzth is satisfied, the behavior of the vehicle 14 is judged gentle and the valve opening duty cycle for the output valve 32F is decreased to reduce the fluid pressure less.

In the above-described manner, the degree of pressure reduction can be controlled so as to be suitable for the behavior of the vehicle 14. The absolute value of the acceleration Ax in the X-axis direction is decreased, whereby the absolute value of the GZ-axis component Ax(GZ) of the acceleration Ax is decreased and the GZ-axis acceleration Agz turns positive (see the middle part of FIG. 6). The rear-wheel lift is thus suppressed.

(Summary)

The above-described brake fluid pressure control device 12 according to the embodiment is equipped with an acceleration acquiring unit (corresponding to the 3-axis acceleration sensor 26 in the embodiment) for acquiring acceleration (corresponding to GX-axis acceleration Agx and GZ-axis acceleration Agz and the GX axis/GZ axis acceleration calculation unit 52 in the embodiment) occurring in the vehicle 14 and a control unit (corresponding to the ECU 20 in the embodiment) for judging the probability of occurrence of a rear-wheel lift on the basis of the acceleration acquired by the acceleration acquiring unit and performing a pressure reduction control on at least the front wheel brake FB if judging that occurrence of a rear-wheel lift is probable.

The ECU 20 adjusts the degree of pressure reduction of the pressure reduction control according to a differentiation value (corresponding to a differentiation value Dgz of GZ-axis acceleration Agz calculated by the differentiation unit 62 in the embodiment) of the acceleration acquired by the acceleration acquiring unit.

Since the degree of pressure reduction of the pressure reduction control is adjusted according to the differentiation value Dgz (which correlates with a rear-wheel lift) of the GZ-axis acceleration Agz, the pressure reduction control can be performed so as to be suitable for a state of the vehicle 14 (i.e., rear-wheel lift behavior).

More specifically, the ECU 20 as the acceleration acquiring unit acquires Z-axis acceleration Az in the vertical direction and X-axis acceleration Ax in the front-rear direction of the vehicle 14, the acceleration Az in the vertical direction being defined so as to be positive in the downward direction that is the direction of the acceleration of gravity and the acceleration Ax in the front-rear direction being defined so as to be positive in the rearward direction in which acceleration occurs when the vehicle is decelerating. The ECU 20 as the control unit calculates GZ-axis acceleration Agz in a rear-wheel lift direction that is perpendicular to, at the center of gravity Cg of the vehicle 14, a straight line connecting the center of gravity Cg of the vehicle 14 and a contact point CPF of the front wheel FW and a ground at the time of occurrence of a rear-wheel lift in the vertical plane including the straight line, based on the acquired Z-axis acceleration Az and the acquired X-axis acceleration Ax. And the ECU 20 adjusts the degree of pressure reduction of the pressure reduction control according to a differentiation value Dgz of the calculated acceleration Agz in the rear-wheel lift direction.

Since as described above the degree of pressure reduction of the pressure reduction control is adjusted according to the differentiation value Dgz of the calculated acceleration Agz in the rear-wheel lift direction, a proper braking force can be secured and a rear-wheel lift can be suppressed at the same time.

As described above using Equation (6) and FIG. 8, the ECU 20 calculates a differentiation value Dgz of the acceleration Agz in the rear-wheel lift direction by calculating an acceleration value Agz in the rear-wheel lift direction every very short time Δt (first prescribed time) and dividing the difference between a GZ-axis acceleration value Agz(n) at a present time n and a past GZ-axis acceleration value Agz (e.g., Agz(n−5)) of an integer times the very short time Δt (second prescribed time) ago by the integer times the very short time Δt (Δt×5 in the embodiment).

Since as described above a differentiation value Dgz of the acceleration Agz in the rear-wheel lift direction is calculated as a gradient that is calculated by dividing the difference between a current acceleration value Agz(n) and a past acceleration value Agz(n−5) by an integer times the very short time Δt, a response that is suitable for each vehicle type can be obtained by setting a proper integer as the multiplier for each vehicle type. The multiplier need not always be an integer.

The ECU 20 as the control unit may increase the degree of pressure reduction proportionally as the differentiation value Dgz in the rear-wheel lift direction becomes smaller. The behavior of the vehicle 14 in the rear-wheel lift direction becomes faster as the absolute value of the differentiation value Dgz (negative) of the acceleration Agz increases. Thus, the behavior of the vehicle 14 can be suppressed more properly by setting the degree of pressure reduction higher as the absolute value of the differentiation value Dgz (negative) increases.

The invention is not limited to the above embodiment; it goes without saying that the invention can be implemented in various manners based on the disclosure of the specification.

According to an aspect of the invention, there is provided a brake fluid pressure control device for vehicles with bar handle, the brake fluid pressure control device comprising: an acceleration acquiring unit which is configured to acquire acceleration that occurs in the vehicle; and a control unit which is configured to judge a probability of occurrence of a rear-wheel lift based on the acceleration acquired by the acceleration acquiring unit, and which is configured to perform a pressure reduction control on a front wheel brake when judging that the occurrence of the rear-wheel lift is probable, the control unit which is configured to adjust a degree of pressure reduction of the pressure reduction control based on a differentiation value of the acceleration acquired by the acceleration acquiring unit.

According to the invention, since the degree of pressure reduction of a pressure reduction control is adjusted according to a differentiation value (which correlates with a rear-wheel lift) of acceleration, the pressure reduction control can be performed so as to be suitable for a state of the vehicle (i.e., rear-wheel lift behavior).

The acceleration acquiring unit may be configured to acquire acceleration in a vertical direction of the vehicle and acceleration in a front-rear direction of the vehicle, the acceleration in the front-rear direction being defined so as to be positive in a rearward direction in which acceleration occurs when the vehicle is decelerating, and the acceleration in the vertical direction being defined so as to be positive in a downward direction that is a direction of acceleration of gravity, and the control unit may be configured to calculate acceleration in a rear-wheel lift direction that is perpendicular to, at a center of gravity of the vehicle, a straight line connecting the center of gravity of the vehicle and a contact point of a front wheel and a ground at a time of occurrence of a rear-wheel lift in a vertical plane including the straight line, based on the acquired acceleration in the vertical direction and the acquired acceleration in the front-rear direction, and be configured to adjust the degree of pressure reduction of the pressure reduction control based on a differentiation value of the acceleration in the rear-wheel lift direction.

Since in this manner the degree of pressure reduction of a pressure reduction control is adjusted based on a differentiation value of acceleration in the rear-wheel lift direction, a proper braking force can be secured and a rear-wheel lift can be suppressed at the same time.

The control unit may be configured to calculate the differentiation value of the acceleration in the rear-wheel lift direction by calculating acceleration in the rear-wheel lift direction every first prescribed time and dividing a difference between current acceleration in the rear-wheel lift direction and acceleration in the rear-wheel lift direction of a second prescribed time ago that is longer than the first prescribed time by the second prescribed time.

Since as described above a differentiation value of acceleration in the rear-wheel lift direction is calculated as a gradient that is calculated by dividing the difference between a current acceleration value and a past acceleration value by the second prescribed time that is longer than the first prescribed time, a response that is suitable for each vehicle type can be obtained by setting the second prescribed time so that it is suitable for each vehicle type.

The control unit may be configured to set the degree of pressure reduction higher as the differentiation value becomes smaller.

The behavior of the vehicle with bar handle in the rear-wheel lift direction becomes faster as the absolute value of the differentiation value (negative) of acceleration increases. Thus, the behavior of the vehicle with bar handle can be suppressed more properly by setting the degree of pressure reduction higher as the absolute value of the differentiation value (negative) increases.

What is claimed is:

1. A brake fluid pressure control device for vehicles with bar handle, the brake fluid pressure control device comprising:
    an acceleration acquiring sensor which is configured to acquire acceleration that occurs in a vehicle; and
    a controller which is configured to judge a probability of occurrence of a rear-wheel lift based on the acceleration acquired by the acceleration acquiring sensor, and which is configured to perform a pressure reduction control on a front wheel brake when judging that the occurrence of the rear-wheel lift is probable,
    the controller which is configured to set a pressure reduction pulse, wherein a pulse width of the pressure reduction pulse when a differentiation value of the acceleration acquired by the acceleration acquiring sensor is smaller than or equal to a threshold value is wider than a pulse width of the pressure reduction pulse when the differentiation value of the acceleration is larger than the threshold value,
    the controller which is configured to adjust a degree of pressure reduction of the pressure reduction control based on the pressure reduction pulse.

2. The brake fluid pressure control device according to claim 1, wherein
    the acceleration acquiring sensor is configured to acquire acceleration in a vertical direction of the vehicle and acceleration in a front-rear direction of the vehicle, the acceleration in the front-rear direction being defined so as to be positive in a rearward direction in which the acceleration in the front-rear direction occurs when the vehicle is decelerating, and the acceleration in the vertical direction being defined so as to be positive in a downward direction that is a direction of acceleration of gravity, and the controller is configured to calculate acceleration in a rear-wheel lift direction that is perpendicular to, at a center of gravity of the vehicle, a straight line connecting the center of gravity of the vehicle and a contact point of a front wheel and a ground at a time of the occurrence of the rear-wheel lift in a vertical plane including the straight line, based on the acquired acceleration in the vertical direction and the acquired acceleration in the front-rear direction, and is configured to adjust the degree of pressure reduction of the pressure reduction control based on a differentiation value of the acceleration in the rear-wheel lift direction.

3. The brake fluid pressure control device according to claim 2, wherein the controller is configured to calculate the differentiation value of the acceleration in the rear-wheel lift direction by calculating the acceleration in the rear-wheel lift direction every first prescribed time and dividing a difference between current acceleration in the rear-wheel lift direction and acceleration in the rear-wheel lift direction of a second prescribed time ago that is longer than the first prescribed time by the second prescribed time.

4. The brake fluid pressure control device according to claim 3, wherein the controller is configured to set the degree of pressure reduction higher as the differentiation value of the acceleration in the rear-wheel lift direction becomes smaller.

5. The brake fluid pressure control device according to claim 2, wherein the controller is configured to set the degree of pressure reduction higher as the differentiation value of the acceleration in the rear-wheel lift direction becomes smaller.

6. The brake fluid pressure control device according to claim 1, wherein the acceleration acquiring sensor is an acceleration sensor mounted to the vehicle at its center-of-gravity position and which detects acceleration in a X-axis direction defined as a front-rear direction, acceleration in a Y-axis direction defined as a left-right direction, and acceleration in a Z-axis direction defined as a vertical direction of the vehicle, the acceleration in the X-axis direction directed rearward relative to the vehicle is positive and the acceleration in the X-axis direction directed forward relative to the vehicle is negative, the acceleration in the Y-axis direction directed leftward relative to the vehicle in a front view is positive and the acceleration in the Y-axis direction directed rightward relative to the vehicle in the front view is negative, and the acceleration in the Z-axis direction directed downward relative to the vehicle is positive and the acceleration in the Z-axis direction directed upward relative to the vehicle is negative.

7. The brake fluid pressure control device according to claim 6, wherein the controller includes a pressure reduction pulse setting unit, a speed/deceleration calculation unit and a GX axis/GZ axis acceleration calculation unit, which are connected to the pressure reduction pulse setting unit, a GZ axis is an axis in a rear-wheel lift direction, a GX axis is an axis that is perpendicular to the GZ axis in a vertical plane that is a center plane of a vehicle body, the GZ axis is an axis that is perpendicular to the GX axis in a XZ plane, and the GZ axis, directions extending obliquely downward and upward from a center of gravity Cg are defined as a positive direction and a negative direction, respectively.

8. The brake fluid pressure control device according to claim 7, wherein the speed/deceleration calculation unit calculates a vehicle body speed (Vv), front wheel deceleration (Df), and rear wheel deceleration (Dr) on a basis of a front wheel speed (Vf) that is output from a front wheel speed sensor and a rear wheel speed (Vr) that is output from a rear wheel speed sensor, and the GX axis/GZ axis acceleration calculation unit calculates GX-axis acceleration (Agx) and GZ-axis acceleration (Agz) on a basis of the acceleration in the X-axis direction and the acceleration in the Z-axis direction.

9. The brake fluid pressure control device according to claim 8, wherein the calculation by the speed/deceleration calculation unit is based according to equations (1) to (3), respectively:

$$Vv=(Vf+Vr)/2 \quad (1)$$

$$Df=\{Vf(\text{current front wheel speed})-Vf(\text{front wheel speed of a very short time } \Delta t \text{ ago})\}/\Delta t \quad (2)$$

$$Dr=\{Vr(\text{current rear wheel speed})-Vr(\text{rear wheel speed of the very short time } \Delta t \text{ ago})\}/\Delta t. \quad (3).$$

10. The brake fluid pressure control device according to claim 8, wherein the GX-axis acceleration (Agx) and the GZ-axis acceleration (Agz) are calculated according to equations (4) and (5), respectively:

$$Agx=Ax(GX)+Az(GX)=Ax \cos \theta + Az(GX)=Ax \cos \theta + Az \sin \theta \quad (4)$$

$$Agz=Az(GZ)+Ax(GZ)=-Az \cos \theta + Ax \sin \theta \quad (5),$$

Ax(GX) is the GX-axis component of the acceleration in the X-axis direction,

Az(GX) is the GX-axis component of the acceleration in the Z-axis direction,

Az(GZ) is the GZ-axis component of the acceleration in the Z-axis direction, and Ax(GZ) is the GZ-axis component of the acceleration in the X-axis direction.

11. The brake fluid pressure control device according to claim 8, wherein the pressure reduction pulse setting unit is equipped with a differentiation unit that sets a predetermined parameter of pressure reduction pulses on a basis of the vehicle body speed (Vv), the front wheel deceleration (Df), and the rear wheel deceleration (Dr), the GX-axis acceleration (Agx) and the GZ-axis acceleration (Agz), and the differentiation value is defined by Dgz and is a differentiation value of the GZ-axis acceleration (Agz), and the differentiation unit calculates the differentiation value (Dgz) of the GZ-axis acceleration (Agz).

12. The brake fluid pressure control device according to claim 11, wherein
the differentiation value of the GZ-axis acceleration (Agz) at a present time n is a quotient obtained by dividing a difference between an acceleration value (Agz(n)) at the present time n and an acceleration value (Agz(n−x)) at a time point (n−x) that is x times a prescribed time ago according to:

$$Dgz(n)=\{Agz(n)-Agz(n-x)\}/(\Delta t \times x) \quad (6).$$

13. The brake fluid pressure control device according to claim 11, wherein
the controller judges whether the vehicle is running or stopped.

14. The brake fluid pressure control device according to claim 13, wherein
if the vehicle is running, the controller judges whether the vehicle is decelerating by judging whether estimated vehicle body deceleration (Db) calculated according to equation (7) is negative (Db<0), $$Db=\{Vv(\text{current vehicle body speed})-Vv(\text{vehicle body speed of a very short time } \Delta t \text{ ago})\}/\Delta t \quad (7).$$

15. The brake fluid pressure control device according to claim 13, wherein
if the differentiation value (Dgz) of the GZ-axis acceleration (Agz) is smaller than or equal to the threshold value, a pulse width of the pressure reduction pulses is set high, and
if the differentiation value (Dgz) of the GZ-axis acceleration (Agz) is larger than the threshold value, the pulse width of the pressure reduction pulses is set low.

16. The brake fluid pressure control device according to claim 1, wherein
the acceleration acquiring sensor is a 3-axis acceleration sensor configured to acquire acceleration corresponding to GX-axis acceleration (Agx) and GZ-axis acceleration (Agz) occurring in the vehicle,
the controller is configured to judge the probability of occurrence of the rear-wheel lift on the basis of the GX-axis acceleration (Agx) and the GZ-axis acceleration (Agz), and perform flail the pressure reduction control on at least flail the front wheel brake if the rear-wheel lift is probable, and
the controller adjusts flail the degree of pressure reduction to a value corresponding to the differentiation value as defined as a differentiation value of the GZ-axis acceleration (Agz) of the acceleration acquired.

17. The brake fluid pressure control device according to claim 16, wherein
the controller calculates the GZ-axis acceleration (Agz) in a rear-wheel lift direction that is perpendicular to, at a center of gravity Cg of the vehicle, a straight line connecting the center of gravity Cg of the vehicle and a contact point of a front wheel and a ground at the occurrence of the rear-wheel lift in a vertical plane including the straight line, based on an acquired Z-axis acceleration in a Z-axis direction and an acquired X-axis acceleration in a X-axis direction,
the controller adjusts the degree of pressure reduction according to the differentiation value of the GZ-axis acceleration (Agz) in the rear-wheel lift direction, and
the controller calculates the differentiation value of the GZ-axis acceleration (Agz) in the rear-wheel lift direction by calculating the GZ-axis acceleration (Agz) in the rear-wheel lift direction at a first prescribed time and dividing a difference between a GZ-axis acceleration value (Agz(n)) at a present time n and a past GZ-axis acceleration (Agz) times a second prescribed time ago by a number times the second prescribed time ago.

18. The brake fluid pressure control device according to claim 17, wherein
the controller increases the degree of pressure reduction proportionally as the differentiation value of the GZ-axis acceleration (Agz) in the rear-wheel lift direction becomes smaller, and
a behavior of the vehicle in the rear-wheel lift direction becomes faster as an absolute value of the differentiation value of the GZ-axis acceleration (Agz) in the rear-wheel lift direction increases.

\* \* \* \* \*